United States Patent
Kobayashi et al.

[11] Patent Number: 5,757,022
[45] Date of Patent: May 26, 1998

[54] IMAGE PROCESSING APPARATUS

[75] Inventors: Takashi Kobayashi; Nobuhiko Ogura, both of Kanagawa-ken, Japan

[73] Assignee: Fuji Photo Film Co., Ltd., Kanagawa, Japan

[21] Appl. No.: 733,182

[22] Filed: Oct. 17, 1996

[30] Foreign Application Priority Data

Oct. 19, 1995 [JP] Japan ................................. 7-271444

[51] Int. Cl.$^6$ ............................ H04N 1/40; G01N 23/20
[52] U.S. Cl. ................................... 250/583; 250/587
[58] Field of Search ......................... 250/583, 587, 250/311

[56] References Cited

U.S. PATENT DOCUMENTS

| | | | |
|---|---|---|---|
| 4,851,675 | 7/1989 | Saotome et al. | 250/327.2 |
| 5,028,781 | 7/1991 | Shimura et al. | 250/583 |

FOREIGN PATENT DOCUMENTS

| | | | |
|---|---|---|---|
| 405240807 | 9/1993 | Japan | 250/583 |
| 406130520 | 5/1994 | Japan | 250/587 |

*Primary Examiner*—Michael J. Tokar
*Assistant Examiner*—Richard Hanig
*Attorney, Agent, or Firm*—Sughrue, Mion, Zinn, Macpeak & Seas, PLLC

[57] ABSTRACT

An image processing apparatus includes a histogram producing section for producing a histogram of density signal levels of pixels constituting the image data, a reference density signal level detecting section for detecting from the histogram a density signal level processed by the maximum number of the pixels in a range excluding the maximum value and the minimum value of the density signal levels, a density signal level conversion range determining section for successively comparing the number of the pixels of each density signal level with a threshold value from the density signal level processed by the maximum number of the pixels to lower density signal levels, thereby determining a density signal level lower limit value of density signal levels to be converted and successively comparing the number of the pixels of each density signal level with a threshold value from the maximum value of the density signal level to lower density signal levels, thereby determining a density signal level upper limit value of density signal levels to be converted, a density signal level conversion value calculating section for calculating a conversion value so that density signal levels between the density signal level lower limit value and the density signal level upper limit value can be converted to density signal levels ranging from white to black and a density signal level converting section for converting the density signal levels of the pixels in accordance with the conversion value. According to the thus constituted image processing apparatus, it is possible to reproduce an electron microscope image having a desired gradation.

4 Claims, 6 Drawing Sheets

IMAGE PROCESSING APPARATUS

BACKGROUND OF THE INVENTION

The present invention relates to an image processing apparatus and, particularly, to such an apparatus which can reproduce an electron beam image having a desired gradation by processing image data obtained by irradiating a metal or non-metal specimen with an electron beam, storing energy of an electron beam transmitted through the specimen in a stimulable phosphor sheet, irradiating the stimulable phosphor sheet with an electromagnetic wave and photoelectrically detecting light emitted from the stimulable phosphor sheet.

DESCRIPTION OF THE PRIOR ART

There is known a detecting method using an electron microscope comprising the steps of irradiating a metal or nonmetal specimen with an electron beam, detecting a diffraction image, transmission image or the like and effecting elemental analysis, composition analysis or structural analysis of the specimen, or irradiating the tissue of an organism with an electron beam and detecting an image of the tissue of the organism.

Conventionally, this method is carried out by employing a photographic film as a detecting material, recording an electron beam image on the photographic film using an electron microscope and observing a visual image with the eyes. However, in the case where a photographic film is employed as a detecting material, since the straight portion of the characteristic curve of a photographic film for an electron microscope is short, it is difficult to determine the proper exposure condition and it is necessary to repeatedly expose films to obtain a proper exposure. Furthermore, it is indispensable to chemically develop the films and, therefore, the operations are unavoidably complicated.

In view of the above, there has been proposed a detecting process using an electron microscope comprising the steps of employing, as a detecting material for the electron beam, instead of a photographic film, a stimulable phosphor which can absorb and store the energy of an electron beam upon being irradiated therewith and release a stimulated emission whose amount is proportional to that of the received energy of the electron beam upon being stimulated with an electromagnetic wave having a specific wavelength range, photoelectrically detecting the stimulated emission released from the stimulable phosphor, converting the detection signal to a digital signal, effecting a predetermined image processing on the obtained image data and reproducing an image on displaying means such as a CRT or the like or a photographic film (See for example, Japanese Patent Application Laid Open No. 61-51738, Japanese Patent Application Laid Open No. 61-93538 and the like).

According to the detecting processes using the stimulable phosphor, development, which is a chemical processing, becomes unnecessary. In addition, improper exposure becomes rare and the exposing operation becomes easy. Further, since the image is reproduced after the detected signal has been converted to a digital signal, the image can be reproduced in a desired manner by effecting signal processing on image data and it is also possible to effect quantitative analysis using a computer. Use of a stimulable phosphor in this process is therefore advantageous.

In the detecting process using the electron microscope which reproduces an electron beam image on a display means such as a CRT or a photographic film based on image data obtained by storing energy of an electron beam transmitted through a metal or non-metal specimen in a stimulable phosphor sheet, irradiating the stimulable phosphor sheet with an electromagnetic wave to release the stored energy of the electron beam as light and photoelectrically detecting the released light, since the range of density signal levels of pixels of the image data is narrow, it is preferable to convert the gradation signal levels of the pixels and then reproduce an electron beam image for observing or analyzing the electron beam image.

In the case of converting density signal levels of pixels of image data having a narrow range, it is normal to effect processing for eliminating the effect of noise and converting only the gradation of an electron beam image of specimen, specifically, to produce a histogram of the density signal levels of the pixels, determine a certain number of pixels as a threshold value, determine the maximum density signal level and the minimum density signal level of pixels among the density signal levels processed by a greater number of pixels than the threshold value and convert the density signal levels of the pixels between these two density signal levels. However, in an electron beam image, the area of the background to be reproduced as white is greatest and the number of pixels to be reproduced as white is greatest. Therefore, the minimum density signal level processed by a number of pixels greater than the threshold value is determined by excluding the density signal level of pixels corresponding to the background and not constituting the image data of the specimen.

However, when the energy of electron beams diffracted by or transmitted through a specimen is stored in a stimulable phosphor sheet using an electron microscope, the energy of electron beams reflected from the casing of the electron microscope is also often stored in the stimulable phosphor sheet or the energy of X-rays produced by the electron beams impinging on a part of the electron microscope is also often stored in the stimulable phosphor sheet. The amount of the electron beams reflected from the casing of the electron microscope and stored in the stimulable phosphor sheet or the X-rays produced by the electron beams impinging on a part of the electron microscope and stored in the stimulable phosphor sheet is lower than that of the electron beams stored in the stimulable phosphor sheet. Therefore, the produced image data normally contain pixels having relatively high density signal levels caused by the electron beams diffracted by or transmitted through a specimen and pixels having relatively low density signal levels caused by the electron beams reflected from the casing of the electron microscope and the X-rays.

Accordingly, at the time of producing a histogram of the density signal levels of pixels, determining a certain number of pixels as a threshold value, determining the maximum density signal level and the minimum density signal level of the pixels and converting the density signal levels of the pixels between these two density signal levels, the relatively low density signal level caused by the electron beams reflected from the casing of the electron microscope and stored in the stimulable phosphor sheet or the X-rays produced by the electron beams impinging on a part of the electron microscope and stored in the stimulable phosphor sheet is determined as the minimum density signal level. It is therefore impossible to reproduce an electron beam image suitable for observation and analysis by converting the density signal levels between the maximum density signal level and the minimum density signal level.

SUMMARY OF THE INVENTION

It is therefore an object of the present invention to provide an image processing apparatus which can reproduce an electron microscope image having a desired gradation by processing image data obtained by irradiating a metal or non-metal specimen with an electron beam, storing energy of the electron beam diffracted from or transmitted through the specimen in a stimulable phosphor sheet, irradiating the stimulable phosphor sheet with an electromagnetic wave and photoelectrically detecting light emitted from the stimulable phosphor sheet.

The above and other objects of the present invention can be accomplished by an image processing apparatus for processing image data obtained by irradiating a specimen with an electron beam, storing energy of the electron beam diffracted by or transmitted through the specimen in a stimulable phosphor sheet, irradiating the stimulable sheet with an electromagnetic wave and photoelectrically detecting light emitted from the stimulable phosphor sheet, the image processing apparatus comprising histogram producing means for producing a histogram of density signal levels of pixels constituting the image data, reference density signal level detecting means for detecting from the histogram a density signal level processed by the maximum number of the pixels in a range excluding the maximum value and the minimum value of the density signal levels, density signal level conversion range determining means for successively comparing the number of the pixels of each density signal level with a threshold value from the density signal level processed by the maximum number of the pixels to lower density signal levels, thereby determining a density signal level lower limit value of density signal levels to be converted and successively comparing the number of the pixels of each density signal level with a threshold value from the maximum value of the density signal level to lower density signal levels, thereby determining a density signal level upper limit value of density signal levels to be converted, density signal level conversion value calculating means for calculating a conversion value so that density signal levels between the density signal level lower limit value and the density signal level upper limit value determined by the density signal level conversion range determining means can be converted to density signal levels ranging from white to black and density signal level converting means for converting the density signal levels of the pixels constituting the image data in accordance with the conversion value calculated by the density signal level conversion value calculating means.

Generally, the amount of electron beams reflected from the casing of the electron microscope and stored in the stimulable phosphor sheet and the amount of X-rays produced by the electron beams impinging on a part of the electron microscope and stored in the stimulable phosphor sheet are lower than that of electron beams diffracted by or transmitted through a specimen. Therefore, if the density signal level of pixels corresponding to the background is excluded, the density signal level processed by the most pixels is normally that of pixels corresponding to the electron beam image of the specimen. However, if the irradiation amount of the electron beams is too great, the number of pixels whose density signal levels are saturated may be greatest and, therefore, it may be necessary to detect the density signal level processed by most pixels based on density signal levels other than this saturated density signal level. In the present invention, since the density signal level processed by most pixels is determined within a range excluding the maximum density signal level and the minimum density signal level, it is possible to eliminate the effect of noise caused by the energy of electron beams reflected from the casing of the electron microscope and stored in the stimulable phosphor sheet and the energy of X-rays produced by the electron beams impinging on a part of the electron microscope and stored in the stimulable phosphor sheet and to convert only the density signal levels of pixels corresponding to the electron beam image of the specimen. Therefore, it is possible to reproduce an electron beam image having excellent observation and analysis properties.

In a preferred aspect of the present invention, the histogram producing means is constituted to produce from the photoelectrically detected image data image data consisting of a small number of pixels for determining gradation converting conditions.

In a further preferred aspect of the present invention, the density signal level conversion range determining means is constituted so as to determine the density signal level lower limit value and the density signal level upper limit value by comparing two different threshold values with the number of pixels of each density signal level.

In the present invention, the stimulable phosphor employed for producing image data may be of any type insofar as it can store electron beam energy and can be stimulated by an electromagnetic wave to release the electron beam energy stored therein in the form of light. However, a stimulable phosphor which can be stimulated by light having a visible light wavelength is preferably employed. More specifically, preferably employed stimulable phosphors include alkaline earth metal fluorohalide phosphors $(Ba_{1-x}M^{2+}_x)FX:yA$ (where $M^{2+}$ is at least one alkaline earth metal selected from the group consisting of Mg, Ca, Sr, Zn and Cd; X is at least one halogen selected from the group consisting of Cl, Br and I, A is at least one element selected from the group consisting of Eu, Tb, Ce, Tm, Dy, Pr, He, Nd, Yb and Er; x is equal to or greater than 0 and equal to or less than 0.6 and y is equal to or greater than 0 and equal to or less than 0.2) disclosed in U.S. Pat. No. 4,239,968, alkaline earth metal fluorohalide phosphors SrFX:Z (where X is at least one halogen selected from the group consisting of Cl, Br and I; and Z is at least one of Eu and Ce) disclosed in Japanese Patent Application Laid Open No. 2-276997, europium activated complex halide phosphors $BaFX \cdot xNaX':aEu^{2+}$ (where each of X and X' is at least one halogen selected from the group consisting of Cl, Br and I; x is greater than 0 and equal to or less than 2; and y is greater than 0 and equal to or less than 0.2) disclosed in Japanese Patent Application Laid Open No. 59-56479, cerium activated trivalent metal oxyhalide phosphors MOX:xCe (where M is at least one trivalent metal selected from the group consisting of Pr, Nd, Pm, Sm, Eu, Tb, Dy, Ho, Er, Tm, Yb and Bi; X is at least one halogen selected from the group consisting of Br and I; and x is greater than 0 and less than 0.1) disclosed in Japanese Patent Application Laid Open No. 58-69281, cerium activated rare earth oxyhalide phosphors LnOX:xCe (where Ln is at least one rare earth element selected from the group consisting of Y, La, Gd and Lu; X is at least one halogen selected from the group consisting of Cl, Br, and I; and x is greater than 0 and equal to or less than 0.1) disclosed in U.S. Pat. No. 4,539,137 and europium activated complex halide phosphors $M''FX \cdot aM'X'bM''^{II}X''_2 \cdot cM'''X'''_3 \cdot xA:yEu^{2+}$ (where M" is at least one alkaline earth metal selected from the group consisting of Be, Sr and Ca; M' is at least one alkaline metal selected from the group consisting of Li, Na, K, Rb and Cs; M'' is at least one divalent metal selected from the group consisting of Be and Mg; M''' is at least one trivalent metal selected from the group consisting of Al, Ga, In and Tl; A is at least one metal oxide; X is at least one halogen selected from the group consisting of Cl, Br and I; each of X', X'' and X''' is at least one halogen selected from the group consisting of F, Cl, Br and I; a is equal to or greater than 0 and equal to or less than 2; b is equal to or greater than 0 and equal to or less than $10^{-2}$; c is equal to or greater than 0 and equal to or less than $10^{-2}$; a+b+c is equal to or greater than $10^{-2}$; x is greater than 0 and equal to or less than 0.5; and y is greater than 0 and equal to or less than 0.2) disclosed in U.S. Pat. No. 4,962, 047.

The above and other objects and features of the present invention will become apparent from the following description made with reference to the accompanying drawings.

DESCRIPTION OF THE PREFERRED EMBODIMENT

Figure 1:
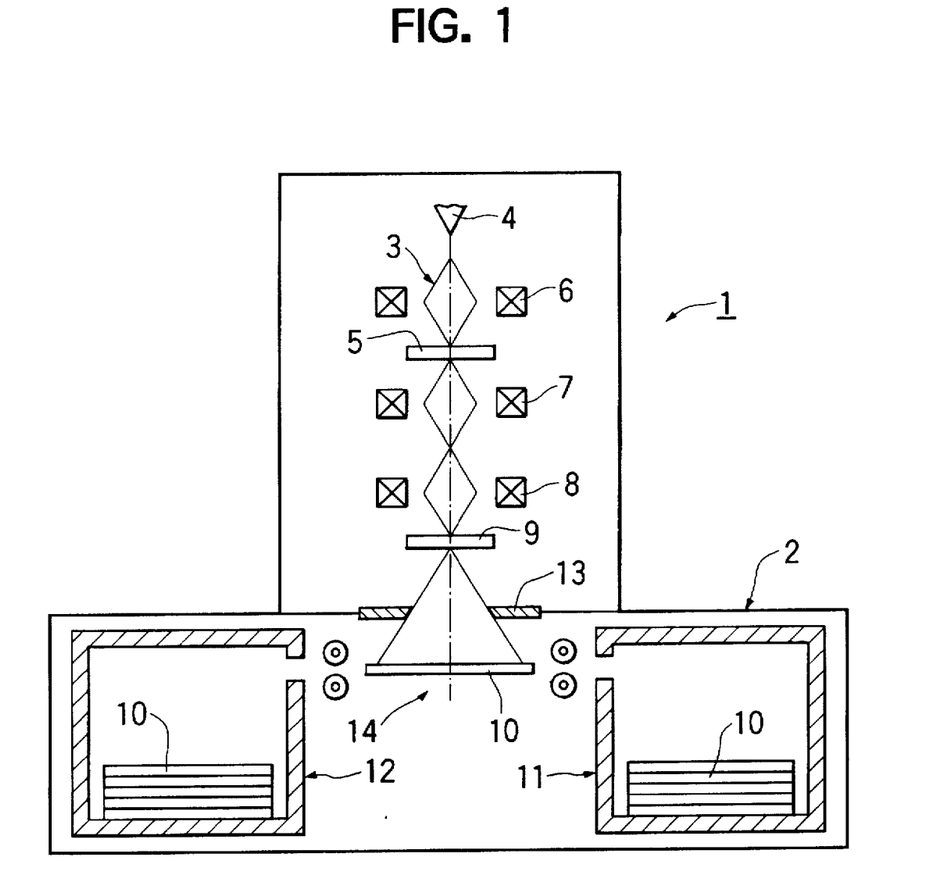
FIG. 1 is a schematic cross-sectional view showing an electron microscope for producing image data to be processed by an image processing apparatus which is an embodiment of the present invention.

As shown in FIG. 1, an electron microscope 1 comprises a camera chamber 2, an electron gun 4 for emitting an electron beam 3, a convergent lens 6 for converging the electron beam 3 emitted from the electron gun 4 to irradiate a specimen 5 therewith, an objective lens 7 for producing an electron beam image of the specimen, an enlarging lens 8 for enlarging the electron beam image and a shutter 9 for allowing the electron beam 3 to pass therethrough for a predetermined time period.

The camera chamber 2 comprises an unexposed sheet magazine 11 for storing unexposed stimulable phosphor sheets 10 and an exposed sheet magazine 12 for storing exposed stimulable phosphor sheets 10 and is provided with a mask 13 opposite the shutter 9 for defining the range of exposure of the stimulable phosphor sheet 10.

The thus constituted electron microscope 1 records an electron beam image transmitted through the specimen 5 in the stimulable phosphor sheet 10 in the following manner. The electron beam 3 emitted from the electron gun 4 is converged onto the specimen 5 by the convergent lens 6 and an electron beam image of the electron beam 3 transmitted through the specimen 5 is formed by the objective lens 7. The electron beam image is enlarged by the enlarging lens 8. The shutter 9 is opened for a predetermined time period, thereby exposing an unexposed stimulable phosphor sheet 10 located at an exposure position to the electron beam 3 transmitted through the specimen 5.

As a result, the image carried by the electron beam 3 transmitted through the specimen 5 is stored in the stimulable phosphor sheet 10 in the form of electron beam energy.

Figure 2:
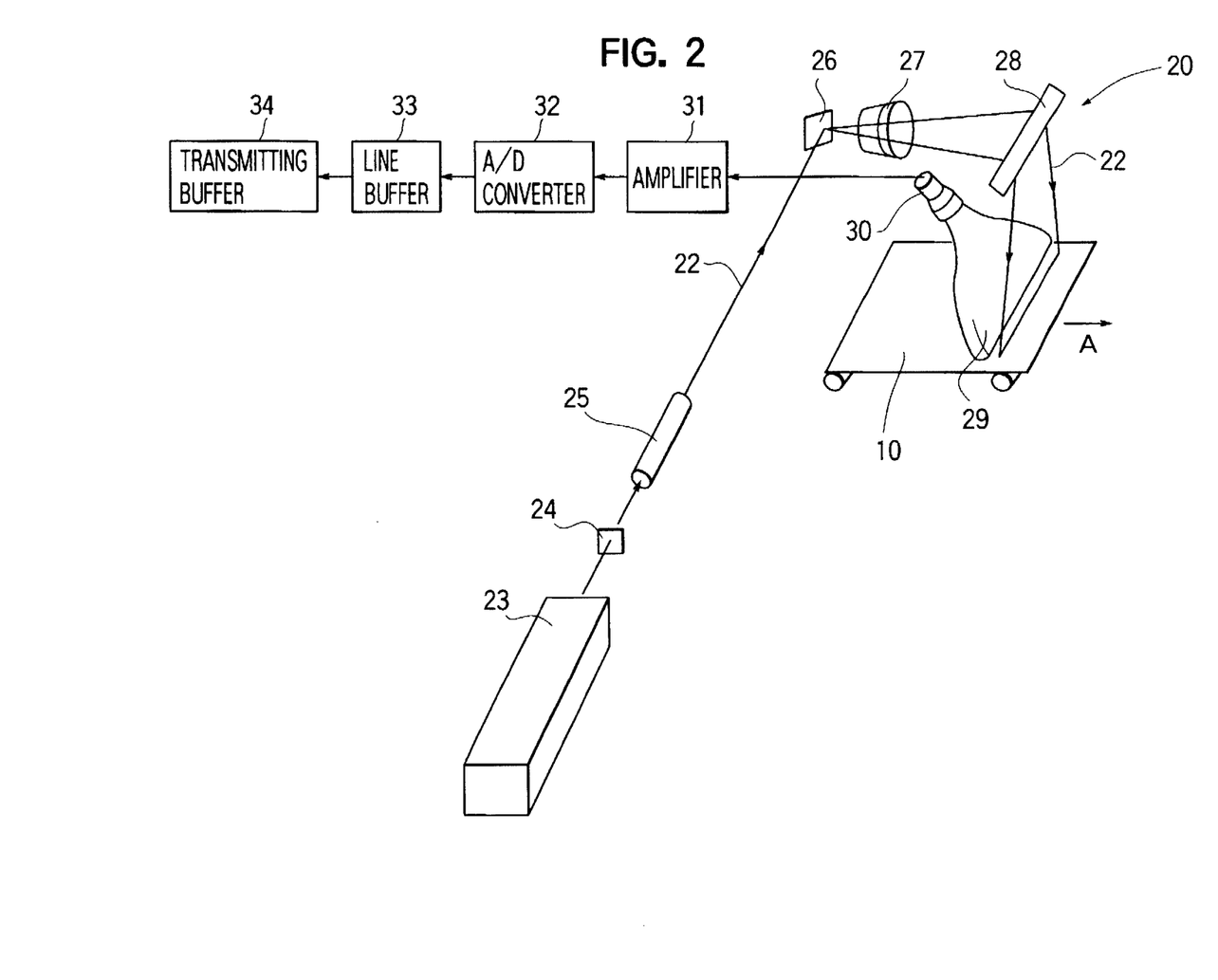
FIG. 2 is a schematic perspective view showing an image reading apparatus for reading an electron beam image stored in a stimulable phosphor sheet and producing image data.

FIG. 2 is a schematic perspective view showing an image reading apparatus 20 for reading an electron beam image stored in a stimulable phosphor sheet 10 in the form of electron beam energy and producing image data.

The stimulable phosphor sheet 10 storing the electron beam image of the specimen 5 in the form of electron beam energy is scanned by a laser beam 22 so that the stimulable phosphor sheet 10 is stimulated and releases stimulated emission.

The laser beam 22 is generated by a laser beam source 23 and passes through a filter 24 to cut off light in the wavelength region corresponding to the wavelength region of stimulated emission to be released from the stimulable phosphor sheet 10 in response to stimulation by the laser beam 22. The beam diameter of the laser beam 22 is accurately adjusted by a beam expander 25 and the laser beam 22 enters a beam deflector 26 such as a galvanometer. The laser beam 22 deflected by the beam deflector 26 passes through an fθ lens 27 and is reflected by a plane reflecting mirror 28, thereby impinging upon the stimulable phosphor sheet 10. The fθ lens 27 ensures that the stimulable phosphor sheet 11 is always scanned with the laser beam 22 at a uniform beam speed.

The stimulable phosphor sheet 10 is conveyed in the direction of the arrow in FIG. 2 in synchronism with the above mentioned scanning with the laser beam 22 so that the whole surface of the stimulable phosphor sheet 10 is scanned by the laser beam 22.

When irradiated with the laser beam 22, the stimulable phosphor sheet 10 releases stimulated emission in an amount proportional to the electron beam energy stored therein and the stimulated emission enters a light guiding sheet 29.

The light receiving end of the light guiding sheet 29 has a linear shape and is positioned in the vicinity of the stimulable phosphor sheet 10 so as to face the scanning line on the stimulable phosphor sheet 10. The exit end of the light guiding sheet 29 is in the form of a ring and is connected to the light receiving surface of a light detector 30 such as a photomultiplier for photoelectrically detecting light. This light guiding sheet 29 is made by processing a transparent thermoplastic resin sheet such as an acrylic synthetic resin and so constituted that the emission introduced from the light receiving end is transmitted to the exit end under repeated total reflection within the light guiding sheet 29 and received by the light receiving surface of the light detector 30 via the exit end.

Therefore, the stimulated emission produced by the stimulable phosphor sheet 10 upon being irradiated with the laser beam 22 enters into the light guiding sheet 29 and is received by the light detector 30 via the exit end under repeated total reflection within the sheet 29.

On the light receiving surface of the light detector 30 is provided a filter which allows only light of the wavelength region of the stimulated emission released from the stimulable phosphor sheet 10 to pass through and cuts off light of the wavelength region of the laser beam so that the light detector 30 can photoelectrically detect only the stimulated emission released from the stimulable phosphor sheet 10.

The stimulated emission photoelectrically detected by the light detector 30 is converted to an electrical signal, amplified by an amplifier 31 having a predetermined amplifying factor so as to produce an electrical signal of a predetermined level and then input to an A/D converter 32. The electrical signal is converted to a digital signal with a scale factor suitable for the signal fluctuation width and input to a line buffer 33. The line buffer 33 temporarily stores image data corresponding to one scanning line. When the image data corresponding to one scanning line have been stored in the line buffer 33 in the above described manner, the line buffer 33 outputs the data to a transmitting buffer 34 whose capacity is greater than that of the line buffer 33 and when the transmitting buffer 34 has stored a predetermined amount of the image data, it outputs the image data to an image processing apparatus.

Figure 3:
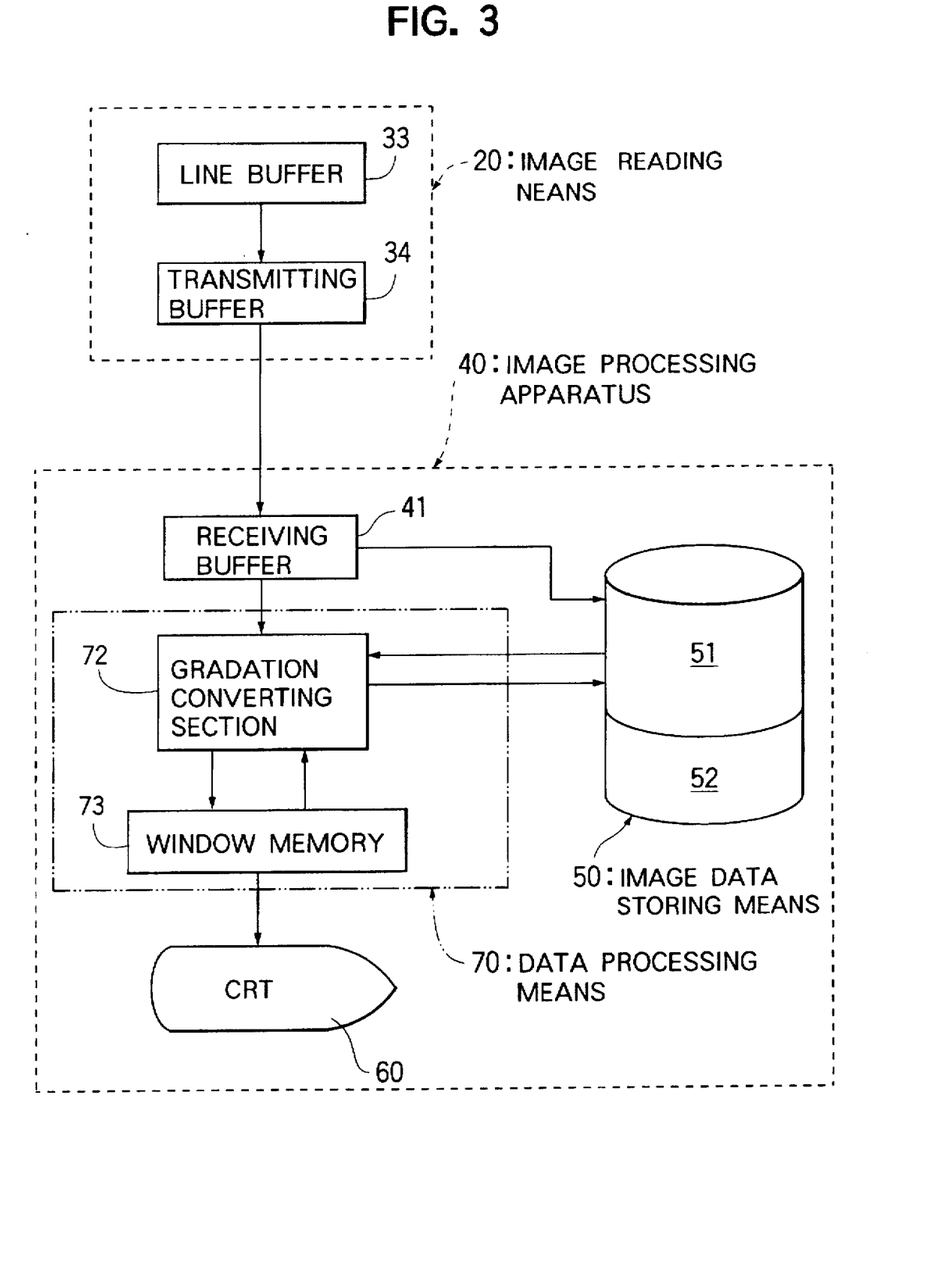
FIG. 3 is a block diagram of an image processing apparatus which is an embodiment of the present invention and an image reading apparatus.

FIG. 3 is a block diagram of the image processing apparatus also showing the line and transmitting buffers of the image reading apparatus.

As shown in FIG. 3, the image processing apparatus 40 includes data processing means 70 for receiving image data carried by the electron beam 3 transmitted through the specimen 5 which were stored in the stimulable phosphor sheet 10, read out by the image reading apparatus 20 and converted to a digital signal, and processing them so as to reproduce a visible image which has desirable density, tone, contrast and the like, as well as excellent observation and analysis property, image data storing means 50 for storing image data input to the data processing means 70 from the image reading apparatus 20, and a CRT 60 for reproducing an electron beam image based on the image data.

The image data temporarily stored in the transmitting buffer 34 of the image reading apparatus 20 are input to a receiving buffer 41 of the image processing apparatus 40 and temporarily stored therein. When a predetermined amount of the image data have been stored in the receiving buffer 41, the stored image data are output to an image data temporary storing section 51 in the image data storing means 50 and stored therein. In this manner, the image data fed from the transmitting buffer 34 of the image reading apparatus 20 to the receiving buffer 41 of the image processing apparatus 40 and temporarily stored therein are further fed from the receiving buffer 41 to the image data temporary storing section 51 in the image data storing means 50 and stored therein. When the image data obtained by scanning the whole surface of the stimulable phosphor sheet 10 with the laser beam 22 have been stored in the image data temporary storing section 51 in the image data storing means 50, a gradation converting section 72 in the data processing means 70 immediately reads the image data from the image data temporary storing section 51, stores them in a window memory 73 of the data processing means 70 and after the image data have been subjected to necessary data processing, displays them on the screen of the CRT 60. Further, the gradation converting section 72 stores only the image data which have been subjected to data processing in this manner in an image data storing section 52 in the image data storing means 50. Then, the gradation converting section 72 erases the image data stored in the image data temporary storing section 51.

Figure 4:
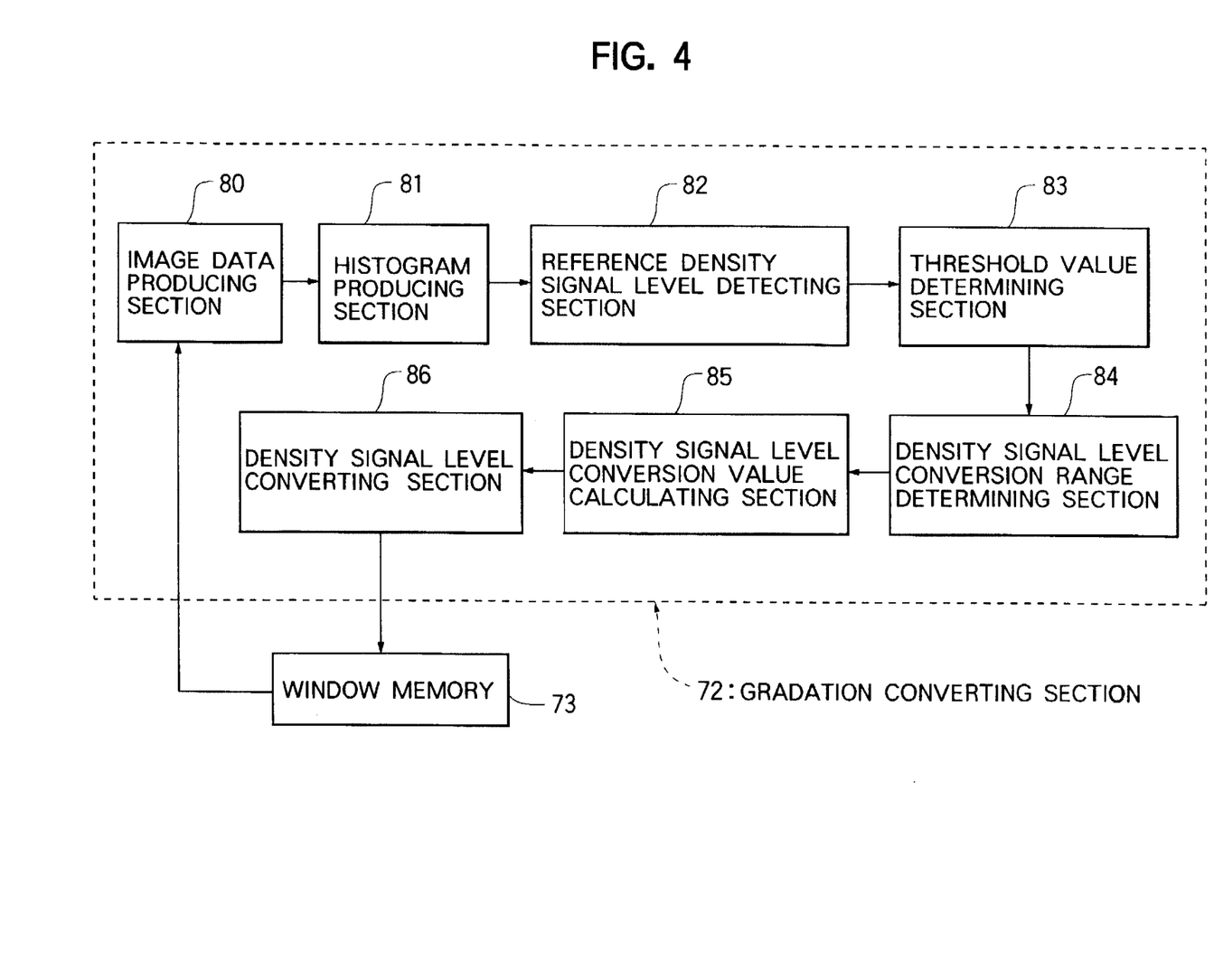
FIG. 4 is a block diagram showing the details of a gradation converting section.

FIG. 4 is a block diagram showing the details of the gradation converting section.

As shown in FIG. 4, the gradation converting section 72 comprises an image data producing section 80 for sampling pixels from the image data read from the image data temporary storing section 51 and two-dimensionally mapped and temporarily stored in the window memory 73 at predetermined intervals and producing image data having a smaller number of pixels to be used for determining gradation converting conditions, a histogram producing section 81 for producing a histogram of density signal levels of the pixels based on the image data produced by the image data producing section 80, a reference density signal level detecting section 82 for detecting, based on the histogram of density signal levels of the pixels produced by the histogram producing section 81, the density signal level processed by the maximum number of pixels in a range excluding the maximum value and the minimum value of the density signal levels, namely, the upper limit value and the lower limit value of the dynamic range, a threshold value determining section 83 for determining a number of pixels to be used as a threshold value, a density signal level conversion range determining section 84 for successively comparing the number of pixels having each density signal level with the threshold value from the density signal level processed by the maximum number of pixels detected by the reference density signal level detecting section 82 to smaller density signal levels, detecting a density signal level at which the number of pixels has continued to be less than the threshold value for a predetermined number of density signal levels, thereby determining the density signal level lower limit value, successively comparing the number of pixels having each density signal level with the threshold value from the maximum value of the density signal level to smaller density signal levels, and detecting a density signal level at which the number of pixels has continued to be greater than the threshold value for a predetermined number of density signal levels, thereby determining the density signal level upper limit value, a density signal level conversion value calculating section 85 for calculating a conversion value of the density signal levels so that the density signal levels of the pixels between the density signal level lower limit value and the density signal level upper limit value detected by the density signal level conversion range determining section 84 can be converted to density signal levels ranging from white to black, and a density signal level converting section 86 for converting the density signal levels of the image data two-dimensionally mapped and temporarily stored in the window memory 73 based on the conversion value calculated by the density signal level conversion value calculating section 85.

The thus constituted image processing apparatus 40 effects image processing on image data obtained by photoelectrically reading the energy of an electron beam stored in the stimulable phosphor sheet 10 and reproduces an electron beam image on the screen of a CRT 60 in the following manner.

When image data produced by the image reading apparatus 20 are stored in the image data temporary storing section 51, the gradation converting section 72 immediately reads image data to be displayed on the screen of the CRT 60 from the image data temporary storing section 51 and two-dimensionally maps and temporarily stores them in the window memory 73. Then, the image data producing section 80 of the gradation converting section 72 samples pixels from the image data two-dimensionally mapped and temporarily stored in the window memory 73 at predetermined intervals, produces image data for obtaining gradation converting conditions which have a smaller number of pixels and outputs them to the histogram producing section 81. The histogram producing section 81 produces a histogram of density signal levels of the pixels based on the image data input from the image data producing section 80.

Figure 5:
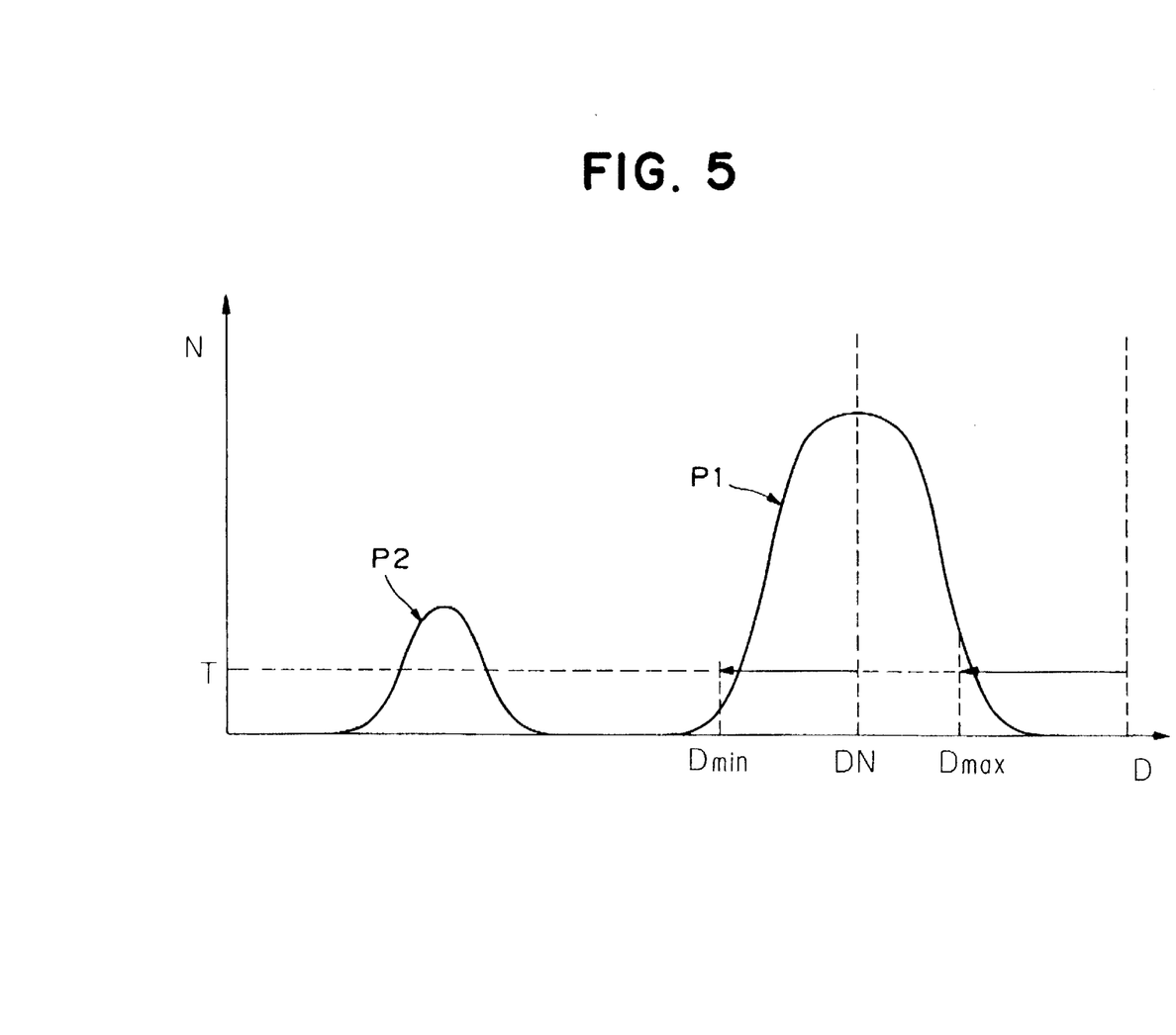
FIG. 5 is a graph showing an example of a histogram of density signal levels of pixels of an electron transmission image of a specimen produced by a histogram producing section.

FIG. 5 is a graph showing an example of a histogram of density signal levels of pixels of an electron transmission image of a specimen 5 produced by the histogram producing section 81.

It can be seen from the histogram of the density signal levels D of pixels shown in FIG. 5 that the image data of the electron beam transmission image of the specimen 5 include pixel group P1 having relatively high density signal levels D and pixel group P2 having relatively low density signal levels D. The pixel group P1 having relatively high density signal levels D correspond to the image data of the electron beam transmission image of the specimen 5 and since their density signal level distribution is narrow, it is necessary to convert the gradation for reproducing an image with improved observation and analysis characteristics. On the other hand, the pixel group P2 having relatively low density signal levels D is caused by noise such as the energy of portions of the electron beam 3 reflected from the casing of the electron microscope 1 and stored in the stimulable phosphor sheet 10, the energy of X-rays generated by the electron beam 3 impinging on a part of the electron microscope 1 and stored in the stimulable phosphor sheet 10 and the like. Therefore, it is necessary to convert only the density signal levels D of pixels corresponding to the pixels of the electron beam transmission image of the specimen 5 for converting the gradation and reproducing an electron beam transmission image having excellent observation and analysis properties on the screen of the CRT 60. In such a case, conventionally, the maximum density signal level, and the minimum density signal level were determined by excluding density levels of pixels corresponding to the background and not constituting the image data of a specimen 5 and density signal levels of pixels between these two density signal levels were converted. However, in the case where the irradiation amount of the electron beam is too great, since the number of pixels whose density signal levels are saturated may be greatest, it is necessary to determine the range of density signal levels based on density signal levels from which these saturated density signal levels are further excluded. If these levels, namely, the density signal levels of pixels corresponding to the background and the saturated density signal levels, are not considered, then, as shown in FIG. 5, since the amount of the electron beam reflected from the casing of the electron microscope 1 and stored in the stimulable phosphor sheet 10 and the amount of X-rays generated by the electron beam 3 impinging on a part of the electron microscope 1 and stored in the stimulable phosphor sheet 10 are lower than that of the electron beam transmitted through the specimen 5 and stored in the stimulable phosphor sheet 10, the density signal level DN processed by the greatest number N of pixels is necessarily included in density signal levels of the pixel group P1. Therefore, if maximum density signal level and the minimum density signal level defining the range of the density signal levels to be converted are determined on the basis of the density signal level DN processed by the greatest number N of pixels and the gradation is converted, it is possible to eliminate the effect of noise and reproduce an electron beam transmission image having excellent observation and analysis properties on the screen of the CRT 60.

Accordingly, the reference density level detecting section 82 detects the density signal level DN processed by the greatest number N of pixels without considering the maximum value and the minimum value of the density signal levels based on the histogram of density signal levels D of pixels produced by the histogram producing section 81 and outputs it to the density signal level conversion range determining section 84. On the other hand, the threshold value determining section 83 outputs a threshold value T corresponding to a predetermined number of pixels stored therein in advance to the density signal level conversion range determining section 84. Based on the density signal level DN processed by the greatest number N of pixels input from the reference density level detecting section 82 and the threshold value T input from the threshold value determining section 83, the density signal level conversion range determining section 84 successively compares the number N of the pixels of each density signal level from the density signal level DN to smaller density signal levels D and detects the density signal level D when the number N of pixels has continued to be less than the threshold value T for "m" density signal levels, thereby determining the density signal level lower limit value Dmin. The density signal level conversion range determining section 84 successively compares the number N of the pixels of each density signal level from the maximum value of the density signal level to smaller density signal levels D and detects the density signal level when the number of pixels has continued to be greater than the threshold value T for "n" density signal levels, thereby determining the density signal level upper limit value Dmax. Then, the density signal level conversion range determining section 84 outputs the density signal level lower limit value Dmin and the density signal level upper limit value Dmax to the density signal level conversion value calculating section 85.

Based on the density signal level lower limit value Dmin and the density signal level upper limit value Dmax input from the density signal level conversion range determining section 84, the density signal level conversion value calculating section 85 calculates a conversion value so that the density signal levels D of pixels between the density signal level lower limit value Dmin and the density signal level upper limit value Dmax detected by the density signal level conversion range determining section 84 can be converted to the density signal levels ranging from white to black and outputs it to the density signal level. converting section 86.

The density signal level converting section 86 converts density signal levels of the image data two-dimensionally mapped and temporarily stored in the window memory 73 based on the conversion value input from the density signal level conversion value calculating section 85.

Then, after the gradation has been converted so as to improve the observation and analysis properties based on the image data two-dimensionally mapped and temporarily stored in the window memory 73, an electron beam transmission image is reproduced and displayed on the screen of the CRT 60.

According to the above described embodiment, since only the density signal levels of the image data corresponding to an electron beam transmission image are converted and the electron beam transmission image is reproduced on the screen of the CRT 60, it is possible to reproduce an electron beam transmission image having desired gradation on the screen of the CRT 60 and improve the observation and analysis properties of an electron beam transmission image.

The present invention has thus been shown and described with reference to specific embodiments. However, it should be noted that the present invention is in no way limited to the details of the described arrangements but changes and modifications may be made without departing from the scope of the appended claims.

Figure 6:
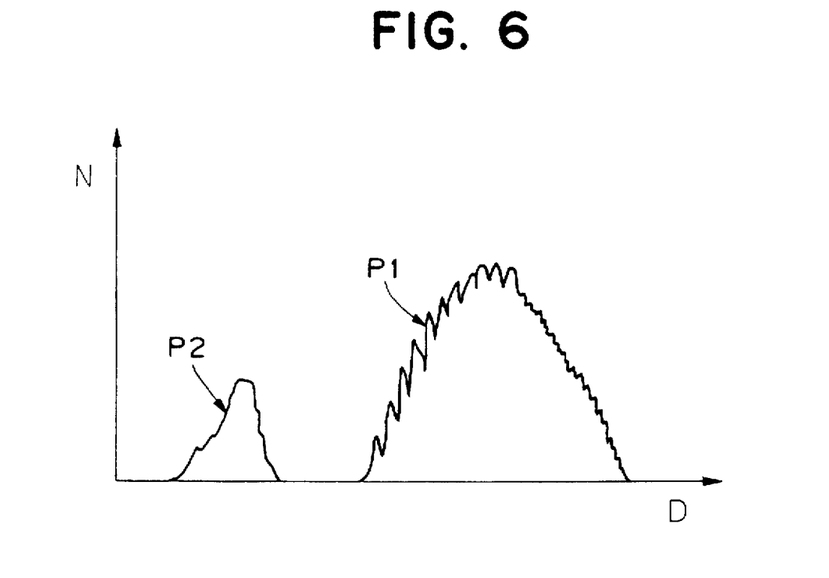
FIG. 6 is a graph showing another example of a histogram of density signal levels of pixels of an electron transmission image of a specimen produced by a histogram producing section.

For example, in the above described embodiment, the density signal level lower limit value Dmin and the density signal level upper limit value Dmax are determined using a single threshold value T. However, as shown in FIG. 6, for instance, in the case where the number of pixels sampled from image data by the image data producing section 80 is small and a histogram of higher density signal levels is not smooth but a histogram of lower density signal levels is smooth, it is preferable to determine a threshold value for determining the density signal level lower limit value Dmin to be higher than that for determining the density signal level upper limit value Dmax. Therefore, depending on the degree of smoothness of the histograms, the density signal level lower limit value Dmin and the density signal level upper limit value Dmax may be determined based on threshold values T1 and T2 by storing different threshold values T1 and T2 in the threshold value determining section 83 for determining the density signal level lower limit value Dmin and the density signal level upper limit value Dmax or different threshold values may be determined by the operator.

Figure 7:
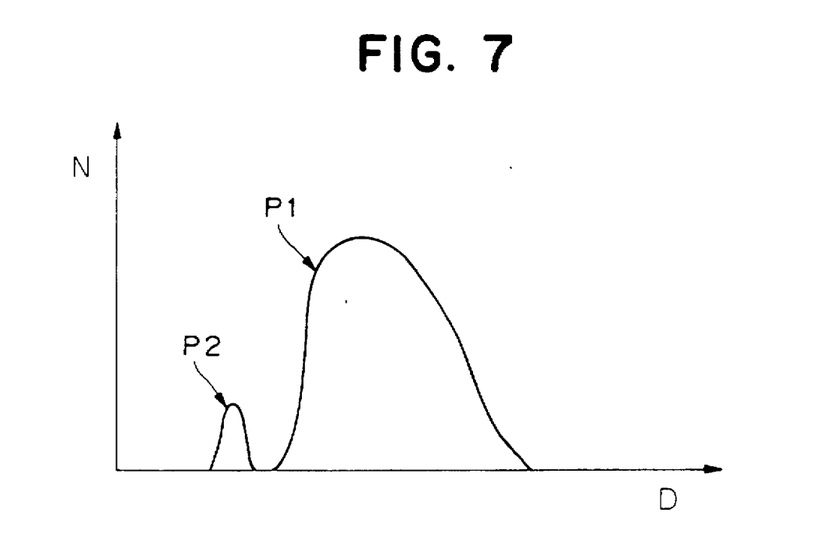
FIG. 7 is a graph showing an example a histogram of density signal levels of pixels corresponding to an electron diffraction image of a specimen.

Further, in the above described embodiment, an electron beam transmission image is reproduced by storing the energy of an electron beam 3 transmitted through the specimen 5 in the stimulable phosphor sheet 10, irradiating the stimulable phosphor sheet 10 with a laser beam 22 to release stored electron beam energy, and effecting image processing on photoelectrically converted image data. However, the present invention can also be applied to the reproduction of an electron beam diffraction image comprising the steps of storing the energy of the electron beam 3 diffracted by the specimen 5 in the stimulable phosphor sheet 10, irradiating the stimulable phosphor sheet 10 with a laser beam 22 to release stored electron beam energy, and effecting image processing on photoelectrically converted image data. FIG. 7 shows an example of a histogram of density signal levels D of pixels corresponding to an electron beam diffraction image of the specimen 5. As shown in FIG. 7, image data of an electron beam diffraction image includes pixel group P1 having relatively higher density signal levels D and pixel group P2 having relatively lower density signal levels D. Therefore, it is possible to reproduce an electron beam diffraction image having desired gradation on the screen of the CRT 60 and improve the observation and analysis properties of the electron beam diffraction image by converting density signal levels D of pixels constituting image data corresponding to the electron beam diffraction image of the specimen 5 similarly to the above described embodiment.

Furthermore, in the above described embodiment, as soon as image data produced by the image reading apparatus 20 have been input and stored in the image data temporary storing section 51, the image processing apparatus 40 is constituted so as to immediately read the image data from the image data temporary storing section 51, effect gradation processing thereon and reproduce an electron beam image on the screen of the CRT 60. However, it is possible to once store image data subjected to gradation processing in the image data storing section 52 and then read the image data stored in the image data storing section 52, thereby reproducing an image on the screen of the CRT 60.

Moreover, in the above described embodiment, when image data produced by the image reading apparatus 20 have been input, the image processing apparatus 20 is constituted so as to automatically effect gradation processing on the image data and reproduce an electron beam image on the screen of the CRT 60. However, the input image data may be stored in the image data storing means 50 and the gradation converting section 72 of the image processing apparatus 40 may read the image data, effect gradation processing thereon and reproduce an image on the screen of the CRT 60 only when the operator inputs instructions that gradation processing should be effected.

Further, in the above described embodiment, although a monochrome image is reproduced on the screen of the CRT 60, a color image may be reproduced.

Furthermore, in the above described embodiments, although an electron beam image is reproduced on the screen of the CRT 60, it may be reproduced on any of various display means other than a CRT 60 and it may be reproduced on a recording material such as a photographic film.

Further, in the present invention, the respective means need not necessarily be physical means and arrangements whereby the functions of the respective means are accomplished by software fall within the scope of the present invention. In addition, the function of a single means may be accomplished by two or more physical means and the functions of two or more means may be accomplished by a single physical means.

According to the present invention, it is possible to provide an image processing apparatus which can reproduce an electron microscope image having a desired gradation by processing image data obtained by irradiating a metal or non-metal specimen, storing energy of an electron beam diffracted by or transmitted through the specimen in a stimulable phosphor sheet, irradiating the stimulable sheet with an electromagnetic wave and photoelectrically detecting light emitted from the stimulable phosphor sheet.

We claim:

1. An image processing apparatus for processing image data obtained by irradiating a specimen with an electron beam, storing energy of the electron beam diffracted by or transmitted through the specimen in a stimulable phosphor sheet, irradiating the stimulable sheet with an electromagnetic wave and photoelectrically detecting light emitted from the stimulable phosphor sheet, the image processing apparatus comprising histogram producing means for producing a histogram of density signal levels of pixels constituting the image data, reference density signal level detecting means for detecting from the histogram a density signal level processed by the maximum number of the pixels in a range excluding the maximum value and the minimum value of the density signal levels, density signal level conversion range determining means for successively comparing the number of the pixels of each density signal level with a threshold value from the density signal level processed by the maximum number of the pixels to lower density signal levels, thereby determining a density signal level lower limit value of density signal levels to be converted and successively comparing the number of the pixels of each density signal level with a threshold value from the maximum value of the density signal level to lower density signal levels, thereby determining a density signal level upper limit value of density signal levels to be converted, density signal level conversion value calculating means for calculating a conversion value so that density signal levels between the density signal level lower limit value and the density signal level upper limit value determined by the density signal level conversion range determining means can be converted to density signal levels ranging from white to black and density signal level converting means for converting the density signal levels of the pixels constituting the image data in accordance with the conversion value calculated by the density signal level conversion value calculating means.

2. An image processing apparatus in accordance with claim 1 wherein the histogram producing means is constituted to produce from the photoelectrically detected image data image data consisting of a small number of pixels for determining gradation converting conditions.

3. An image processing apparatus in accordance with claim 1 wherein the density signal level conversion range determining means is constituted so as to determine the density signal level lower limit value and the density signal level upper limit value by comparing two different threshold values with the number of pixels of each density signal level.

4. An image processing apparatus in accordance with claim 2 wherein the density signal level conversion range determining means is constituted so as to determine the density signal level lower limit value and the density signal level upper limit value by comparing two different threshold values with the number of pixels of each density signal level.

* * * * *